Figure 1:
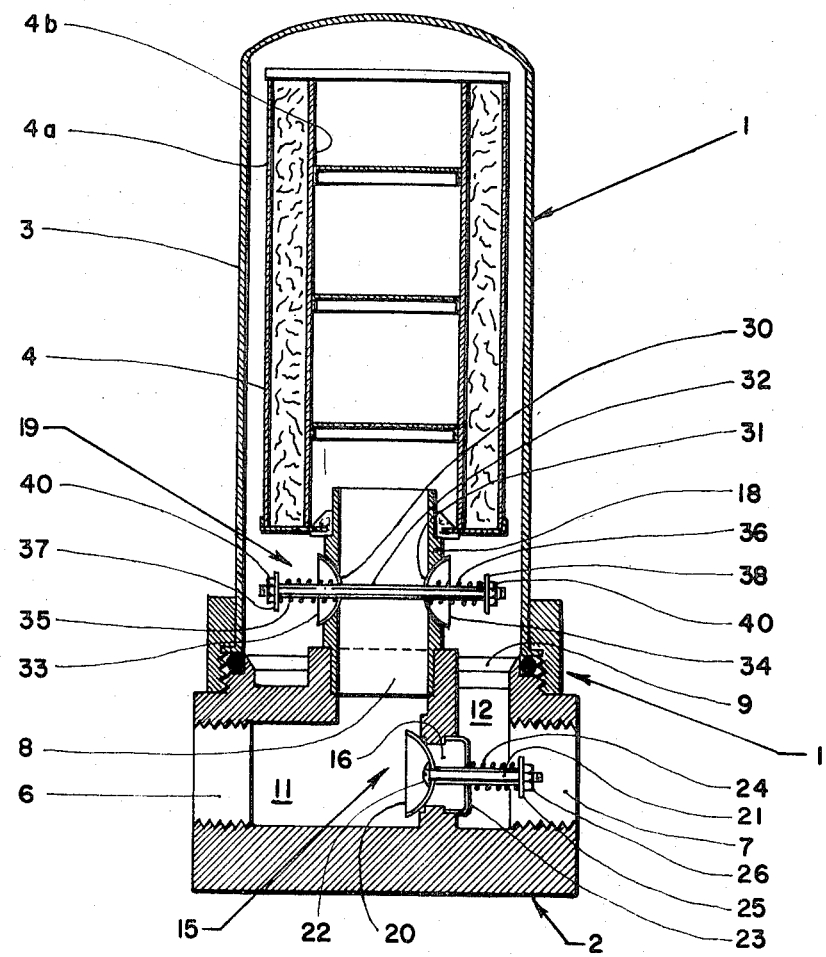

United States Patent
Barthe

[15] 3,656,621
[45] Apr. 18, 1972

[54] SINGLE LINE RETURN FILTER
[72] Inventor: Henry P. Barthe, Pittsburgh, Pa.
[73] Assignee: Schroeder Brothers Corporation, McKees Rocks, Pa.
[22] Filed: Oct. 1, 1970
[21] Appl. No.: 77,202

[52] U.S. Cl. .................................................210/133
[51] Int. Cl. ....................................................B01d 27/10
[58] Field of Search ...............................210/133, 136, 117

[56] References Cited

UNITED STATES PATENTS 2,188,745   1/1940   Wagner ..............................210/133
2,253,684   8/1941   Burckbalter .........................210/133

Primary Examiner—J. L. DeCesare
Attorney—Webb, Burden, Robinson & Webb

[57] ABSTRACT

A single line return filter for insertion in a bidirectional conduit comprising a housing having a filter element disposed therein. The housing has a reservoir-side port which is connected by a first passage to the discharge side of the filter element. The housing also has a pump-side port which is connected by a second passage to the inlet side of the filter element. A weakly biased check valve permits flow from said first passage to said second passage when there is a slight pressure drop from the discharge side to the inlet side of the filter thereby preventing backflow through the element. The bias is sufficient to close the check valve when the flow through said filter ceases thereby directing flow through the filter when there is a pressure drop from the inlet side to the discharge side of the filter element. A strongly biased check valve assembly permits flow from the second passage to the first passage when the pressure drop from the inlet side of the filter element to the discharge side exceeds a preset safe level.

2 Claims, 2 Drawing Figures

PATENTED APR 18 1972 3,656,621

INVENTOR.
HENRY P. BARTHE
By Webb, Burden, Robinson & Webb

SINGLE LINE RETURN FILTER

BACKGROUND

A hydraulic system comprises reservoirs, pumps and working elements, such as hydraulic cylinders and motors. A hydraulic system must be maintained free of contaminants by suitable filters. The source of contamination includes, for example, solid products of chemical breakdown of the fluid medium itself, contaminants created by pump cylinder and valve port wear and erosion, contaminants present when the hydraulic system is first started up and those introduced by the installation of new or additional elements to the system or when adding additional fluid to the system.

The type of filter or filters and the placement thereof in a particular hydraulic system depends upon the nature of the hydraulic system itself. It is an advantage of filters according to this invention that they may be positioned in a return line conduit which is the sole communication between a remote reservoir and the remainder of the hydraulic system. In this instance, of course, the conduit is a bidirectional conduit. Such an arrangement is especially suitable for the hydraulics system on lift trucks.

A filter assembly according to this invention comprises a housing having two ports for connecting the assembly into a bidirectional conduit. One port is designated the reservoir-side port and the other the pump-side port. In a single return line system as described above, the reservoir-side port is in communication with the reservoir and the pump-side port in communication with the remainder of the hydraulic system. The housing preferably comprises a canister, for example, threadably secured to a base having the parts therein. A filter element having an inlet side and a discharge side is disposed inside the housing. Preferably the filter is a tubular type filter disposed inside the canister thereby dividing the canister into an inlet side and an outlet side. The housing and preferably the base thereof defines a first passage connecting the reservoir-side with the discharge side of the filter element. A second passage connects the pump-side port with the inlet side of the filter element.

A check valve, weakly biased in a close position, permits the flow from the first passage to the second passage when there is a slight pressure drop from the discharge side to the inlet side of the filter thereby preventing backflow through the filter. The bias is sufficient to close the check valve when the flow through said pump ceases. It is thereby positioned to direct fluid through the filter element on its return to the reservoir. A check valve, strongly biased in the close position, permits flow from the second passage to the first passage when the pressure drop from the inlet side to the discharge side of the filter element exceeds a preset level. The preset level is determined by the design of the element and the amount of back pressure which can be tolerated in the return line of the particular system in which the filter is used.

According to a preferred embodiment, the first passage connects the reservoir-side port to a port centrally located on an adjacent face of the base. A tubular valve seat connects the central port with the discharge side of a tubular filter. A check valve, preferably a pair of spring biased poppet valves mounted on a common shaft, cooperates with the cylindrical valve seat to permit flow from the first passage to the second passage. It is further preferred that the strongly biased check valve is located inside the base and is preferably a spring biased poppet valve.

Figure 2:
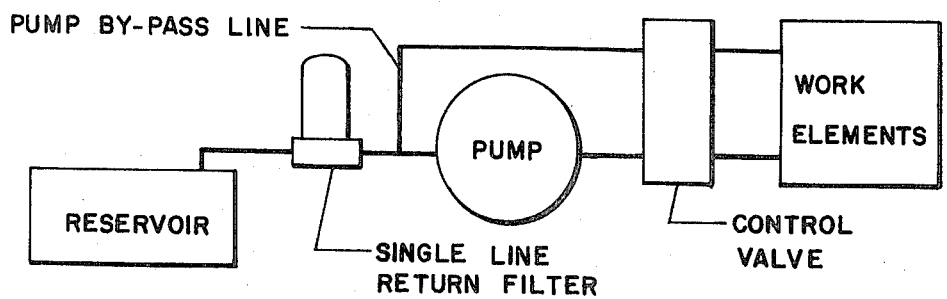

Further features and other objects and advantages of this invention will become clear from the study of the following detailed description made with reference to the drawings in which:

FIG. 1 is a section through a single line return filter assembly according to this invention; and FIG. 2 is a diagram of a hydraulic system in which the single line return filters according to this invention are useful.

Referring now to FIG. 1, the housing 1 comprises a base 2 and a canister 3. The canister is threadably secured to the base with a gasket or other suitable sealing means provided to maintain a hydraulic seal. A tubular filter element 4 is disposed inside the canister and is arranged to divide the canister such that the filter has an inlet side 4a and a discharge side 4b. The base is provided with a port 6 defined as a reservoir-side port and a second port 7 defined as a pump-side port for connecting the filter assembly in a bidirectional conduit (not show). The base has a central port 8 disposed on a side adjacent the side in which the reservoir-side port 6 is located. The central port opens into the interior of the canister 3, that is, on the discharge side 4a of the filter. The base defines a first passage 11 connecting the reservoir-side port with the central port 8. The base has a peripheral port 9 opening into the canister on the inlet side 4b of the filter. The peripheral port is joined by a second passage 12 to the pump-side port 7. A tubular valve seat 18 extends between the central port and the discharge side of the tubular filter. Hence, the discharge side of the tubular filter is connected to the reservoir-side port by the first passage 11 and the tubular valve seat 18.

A check valve 15 is inserted in an opening 16 which joins the first and second passages inside the base 2. Preferably, the opening is aligned with the reservoir-side and pump-side ports. In this way, portions of the check valve may be inserted into the base from opposite sides of the opening and joined together with relative ease. The strongly biased check valve may be of any common type such as ball, flap, or poppet. In FIG. 1 a particular poppet valve is shown in which the closure element 20 is fastened to a shaft 21 by a bolt 22. The shaft extends through the opening 16 and through a guide 23 which straddles the opening 16. A helical spring 24 surrounds the shaft and bears at one end upon the guide 23 and at the other end against a washer or flange 25. The washer or flange is secured upon the shaft by a nut 26 threaded thereto.

The weakly biased valve 19 is easily assembled upon the tubular valve seat 18 when the canister is removed from the base. The tubular valve seat has openings 30 and 31 disposed on opposite sides of the tubular seat. A valve stem 32 extends entirely through both openings. Closure elements 33 and 34 having openings centrally disposed therein are slidably mounted on the valve stem 32 in a manner to close the openings 30 and 31. Thereafter, springs 35 and 36 are disposed about the valve stem 32 having one end bearing upon the closure elements and the other end upon flanges or washers 37 and 38 which are secured in position by nuts 40 and 41 threaded to the ends of the valve stem 32.

The operation of a single line return filter according to this invention can be understood by reference to FIG. 2 which shows a schematic diagram of a hydraulic system in which single line return filters might be used. When the work elements require hydraulic fluid under pressure, the pump draws fluid from the reservoir. The fluid must pass through the single line return filter. It does so by overcoming the weakly biased valve 19, thereby passing from the reservoir-side port through the first passage into the second passage and out the pump-side port without backflow through the filter element. After the pump has drawn all the hydraulic fluid necessary for proper functioning of the work elements, there is a slight pause in which no fluid flows through the single line return filter. At this instance the weakly biased spring closes valve assembly 19. Therefore, fluid returning to the reservoir from the remainder of the system enters the pump-side port and passes through the second passage to the inlet side of the filter, through the filter to the discharge side of the filter through the second passage and out through the reservoir-side port. Depending upon the particular hydraulic system, there is a limit to the amount of back pressure that may be tolerated in the return line. When this pressure is exceeded, the strongly biased check valve 15 is open allowing passage of fluid from the pump-side port through the second and first passages directly to the reservoir-side port. It is intended that during normal operating conditions the entire fluid flow will be channeled through the filter on return to the reservoir.

Having thus described the invention with the detail and particularity as required by the Patent Laws, what is desired to have protected by Letters Patent is:

1. A single line return filter assembly comprising:
   A. a housing having two ports for connecting the assembly into a bidirectional conduit, one port being designated the reservoir-side port and the other the pump-side port;
   B. a filter element disposed inside said housing having an inlet side and a discharge side;
   C. said housing defining a first passage connecting the reservoir-side port with the discharge side of the filter element and a second passage connecting the pump-side port with the inlet side of the filter element;
   D. there being a weakly biased check valve assembly permitting flow from said first passage to said second passage when there is a slight pressure drop from a discharge side to the inlet side of the filter element, said bias being sufficient to close the check valve when flow is discontinued; and,
   E. there being a strongly biased check valve assembly between said first and second passages permitting flow from the second passage to the first passage when the pressure drop from the inlet side to the discharge side of the filter element exceeds a preset level.

2. A single line return filter assembly comprising:
   A. a housing consisting of a base and a canister secured together, said base having two ports for connecting the assembly to a bidirectional conduit, one port being designated the reservoir-side port and the other the pump-side port;
   B. a tubular filter disposed inside said canister dividing said canister into two chambers, said filter having an inlet side and a discharge side;
   C. said base defining a first passage connecting said reservoir-port with the canister chamber adjacent the discharge side of the filter, said base defining a second passage connecting the reservoir-side port to a central port opening into the canister chamber adjacent the discharge side of the filter;
   D. there being a tubular valve seat connecting said central port with said discharge side of said filter;
   E. there being a weakly biased check valve assembly disposed in said tubular valve seat permitting flow between the canister chambers when there is a slight pressure drop from a discharge side to the inlet side of the filter element, said bias being sufficient to close the check valve when flow is discontinued; and
   F. there being a strongly biased check valve assembly between said first and second passages within the base permitting flow from the second passage to the first passage when the pressure drop from the inlet side to the discharge side of the filter element exceeds a preset level.

* * * * *

UNITED STATES PATENT OFFICE
CERTIFICATE OF CORRECTION

Patent No. 3,656,621　　　　　　　　　Dated April 18, 1972

Inventor(s)　　Henry P. Barthe

It is certified that error appears in the above-identified patent and that said Letters Patent are hereby corrected as shown below:

Column 1, line 38, after "reservoir-side" insert -- port --.

Signed and sealed this 11th day of February 1975.

(SEAL)
Attest:

RUTH C. MASON
Attesting Officer

C. MARSHALL DANN
Commissioner of Patents
and Trademarks